(12) United States Patent
Shimizu

(10) Patent No.: US 10,454,685 B2
(45) Date of Patent: Oct. 22, 2019

(54) AUTHENTICATING APPARATUS THAT EXECUTES USER AUTHENTICATION BY COMPARING ENTERED PASSWORD WITH SET PASSWORD

(71) Applicant: KYOCERA Document Solutions Inc., Osaka (JP)

(72) Inventor: Takeo Shimizu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 152 days.

(21) Appl. No.: 15/681,358

(22) Filed: Aug. 19, 2017

(65) Prior Publication Data
US 2018/0054310 A1     Feb. 22, 2018

(30) Foreign Application Priority Data
Aug. 19, 2016   (JP) ................................ 2016-161002

(51) Int. Cl.
H04L 9/32       (2006.01)
G06F 21/31      (2013.01)
H04L 29/06      (2006.01)

(52) U.S. Cl.
CPC ............ H04L 9/3226 (2013.01); G06F 21/31 (2013.01); H04L 63/083 (2013.01)

(58) Field of Classification Search
USPC .......................................................... 726/5
See application file for complete search history.

(56) References Cited

U.S. PATENT DOCUMENTS

2005/0274796 A1* 12/2005 Miyashita ............... G06F 21/31
235/382

FOREIGN PATENT DOCUMENTS

| JP | 2003-087477 A | 3/2003 |
| JP | 2005-038416 A | 2/2005 |
| JP | 2005-354550 A | 12/2005 |

* cited by examiner

*Primary Examiner* — Kambiz Zand
*Assistant Examiner* — Aubrey H Wyszynski
(74) *Attorney, Agent, or Firm* — Hawaii Patent Services; Nathaniel K. Fedde

(57) ABSTRACT

An image forming apparatus that is an authenticating apparatus includes an authentication-processing unit, a display area, a display-control unit and a re-entry-processing unit. The authentication-processing unit executes user authentication by comparing an entered password with a set password. The display area displays an entire entered password so as to be visible when non-matching characters are included in the entered password. The display-control unit causes a re-entry screen on which an input field is arranged in which correction characters are entered to be displayed. The re-entry-processing unit corrects the non-matching characters of the entered password based on correction characters that are entered in the input field. The authentication-processing unit compares the entered password that is corrected by the re-entry-processing unit with the set password.

6 Claims, 9 Drawing Sheets

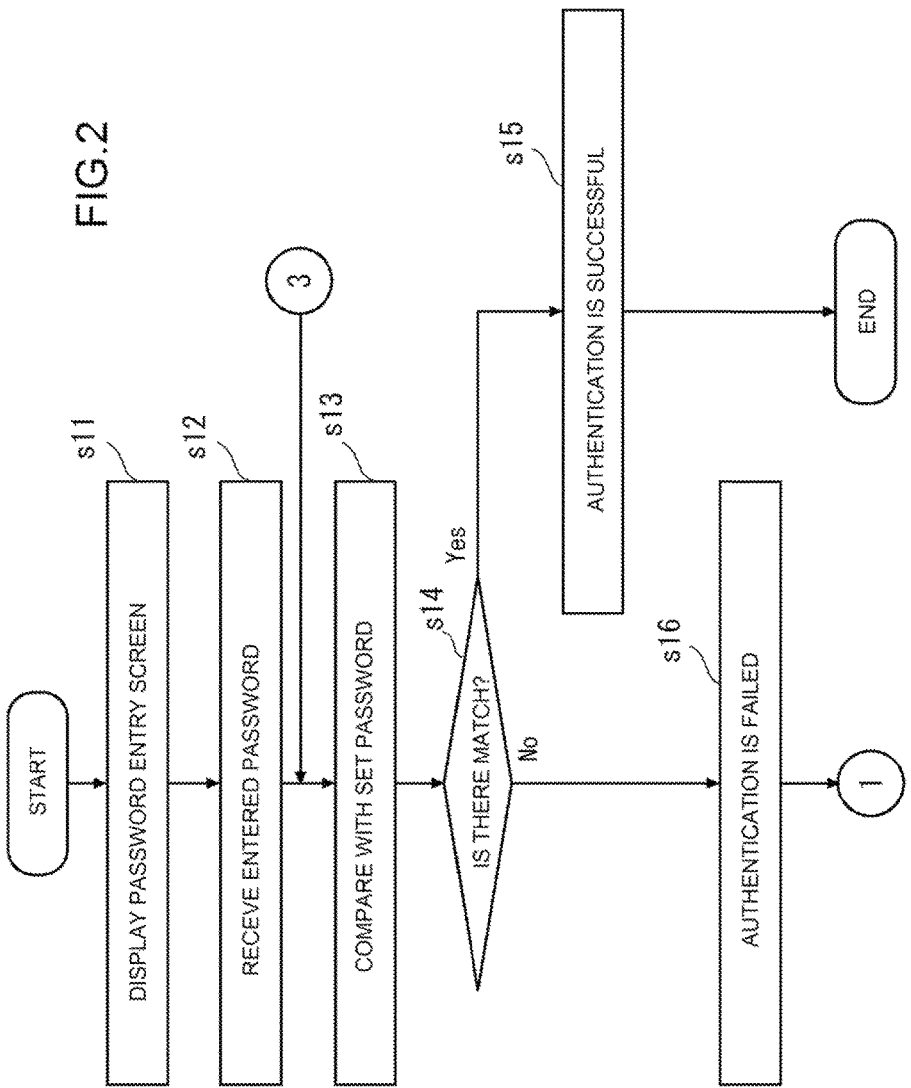

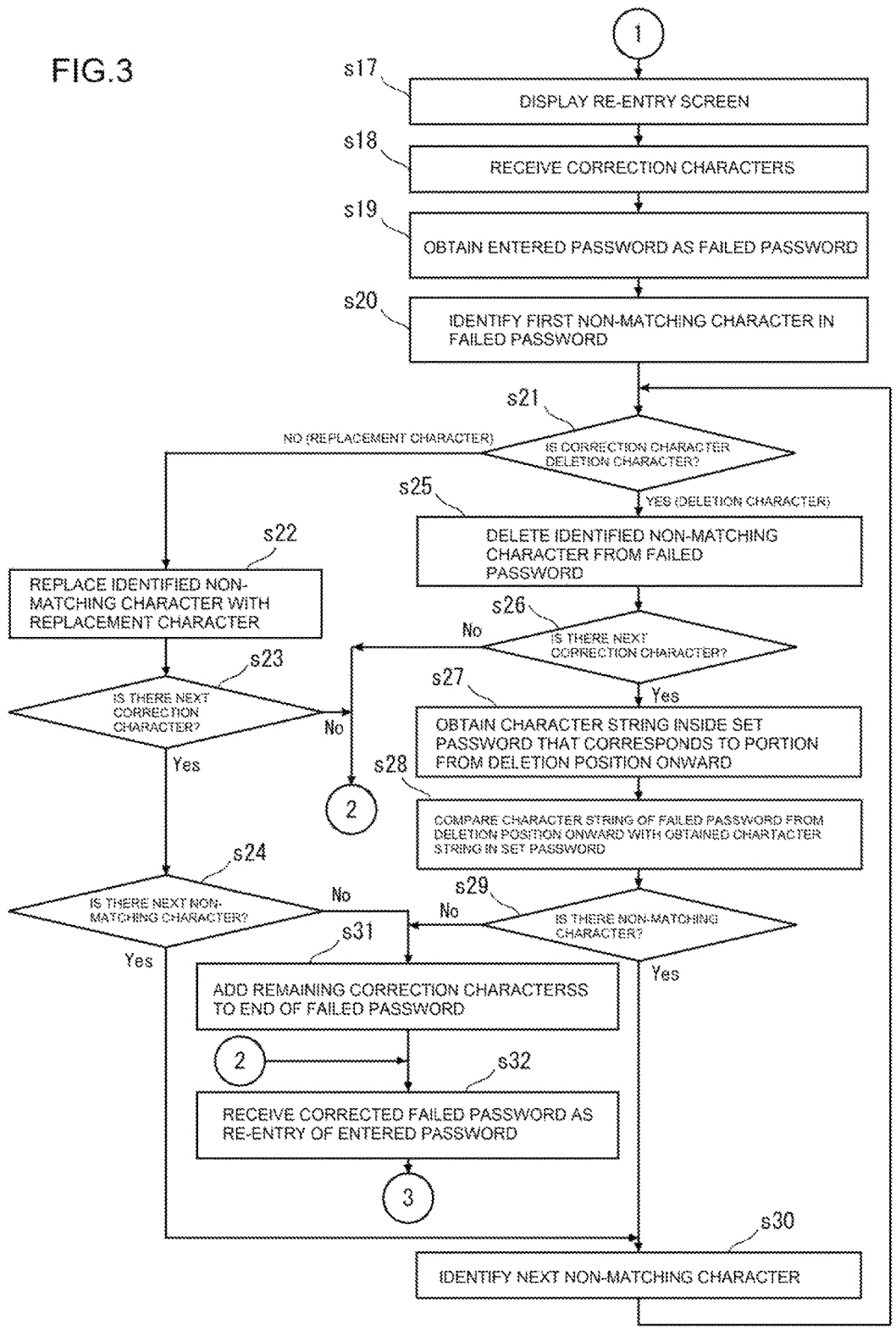

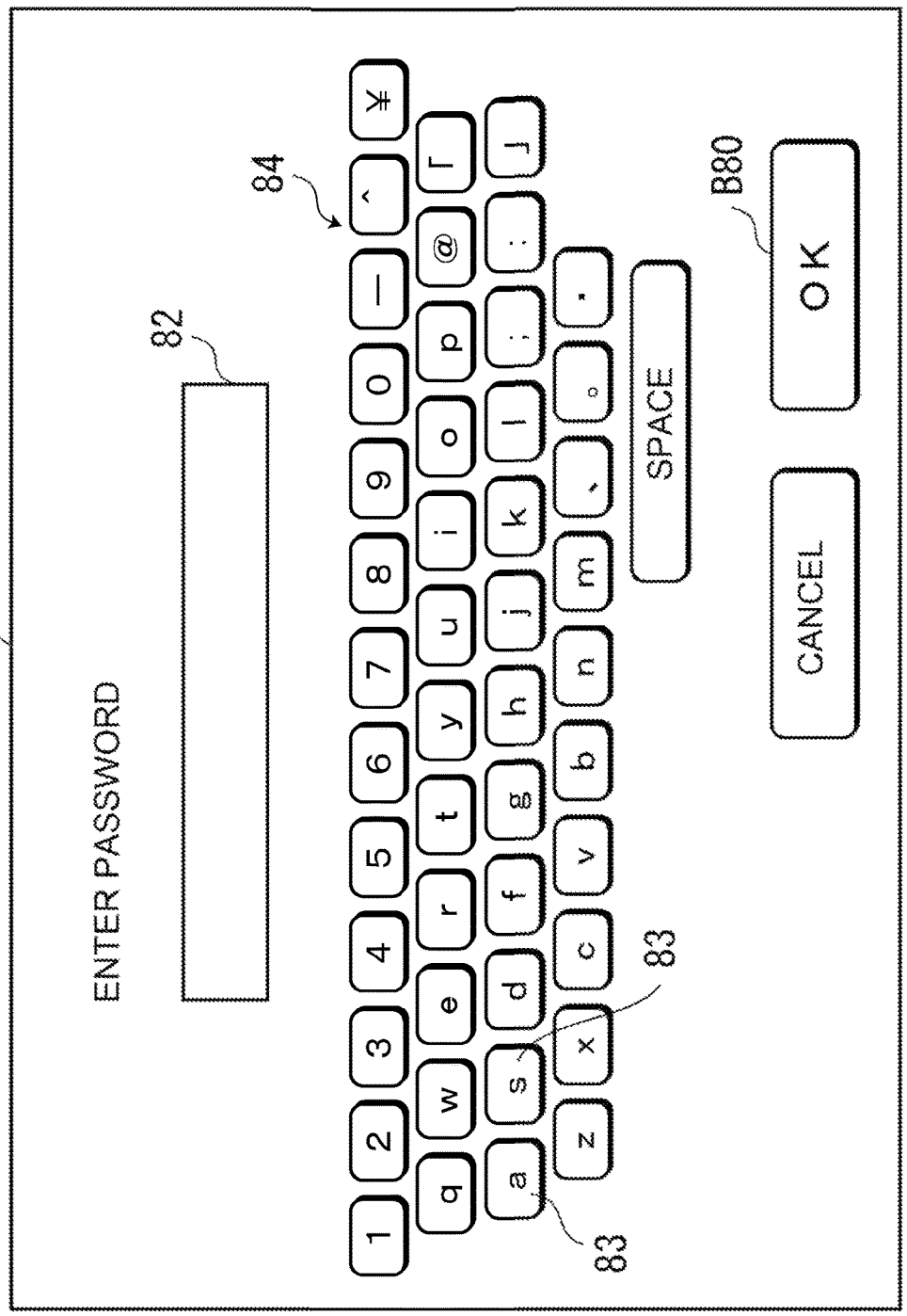

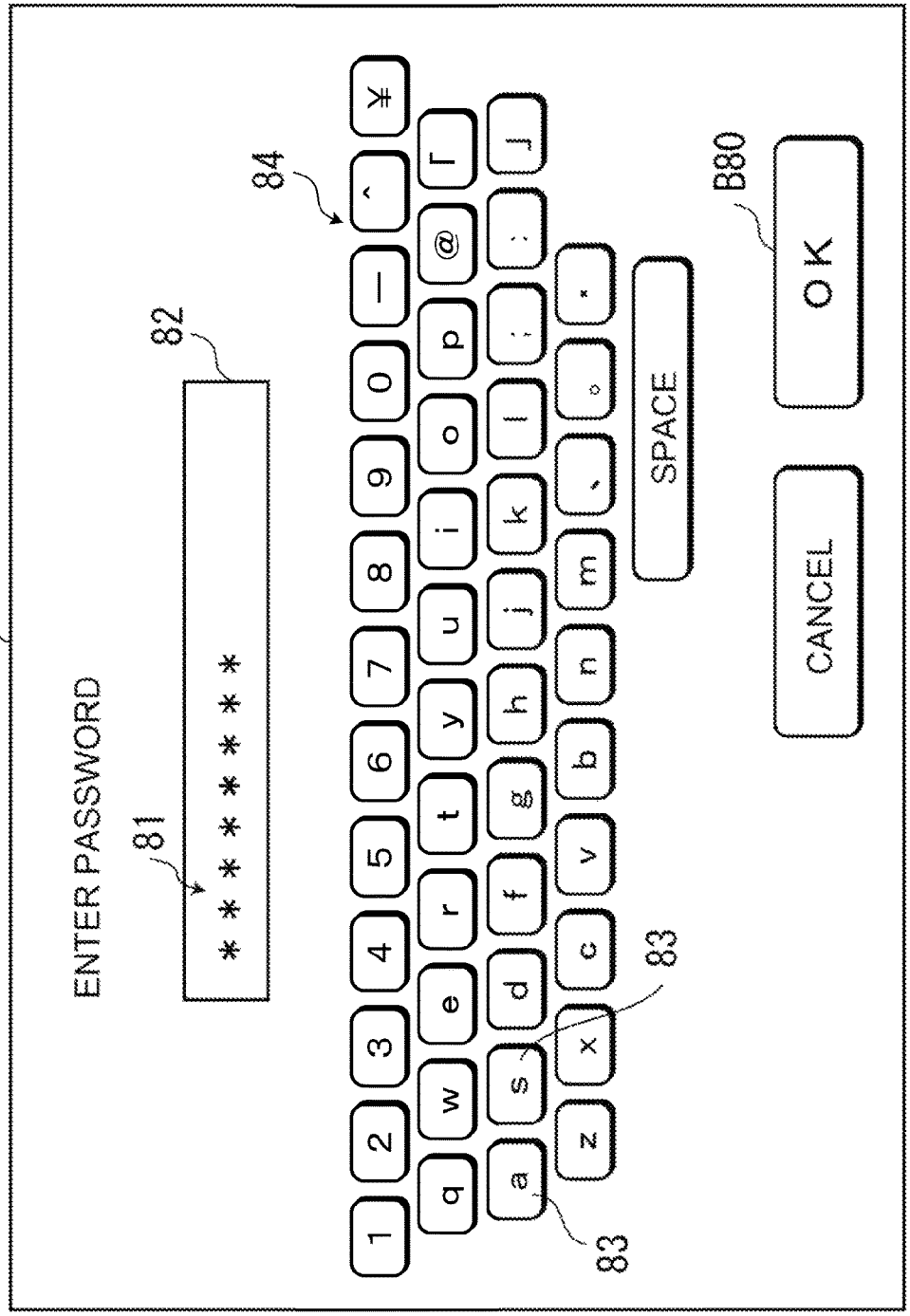

AUTHENTICATING APPARATUS THAT EXECUTES USER AUTHENTICATION BY COMPARING ENTERED PASSWORD WITH SET PASSWORD

INCORPORATION BY REFERENCE

This application is based on and claims the benefit of priority from Japanese Patent Application No. 2016-161002 filed on Aug. 19, 2016, the contents of which are hereby incorporated by reference.

BACKGROUND

The present disclosure relates to an authenticating apparatus that executes user authentication by comparing an entered password with a set password.

In an electronic device that performs user authentication using a password, when a preset password is entered it becomes possible to access specified information. When a wrong password is entered, a notification is given that indicates that the password is wrong, and the entire password must be re-entered.

In recent years, the conditions for setting passwords have become strict from the aspect of security, and passwords are becoming more sophisticated. Therefore, mistakes in entering passwords occur often, and situations in which passwords must be re-entered are increasing. Therefore, technology is proposed for simplifying the operation of re-entering a password. In typical technology, the correct portion of an entered password can be displayed so as to be unrecognizable, and the wrong portion can be displayed so as to be recognizable, and only the wrong portion is re-entered.

SUMMARY

The authenticating apparatus according to the present disclosure includes an authentication-processing unit, a display area, a display-control unit and a re-entry-processing unit. The authentication-processing unit executes user authentication by comparing an entered password with a set password. The display area displays an entire entered password so as to be visible when non-matching characters that are different from the set password are included in the entered password. The display-control unit causes a re-entry screen to be displayed on which an input field in which correction characters that correct the non-matching characters of the entered password are entered is arranged. The re-entry-processing unit corrects the non-matching characters of the entered password based on correction characters that are entered in the input field. The authentication-processing unit compares the entered password that is corrected by the re-entry-processing unit with the set password.

BRIEF DESCRIPTION OF THE DRAWINGS

FIG. 2 is a flowchart illustrating the flow of an authentication process of the image forming apparatus illustrated in FIG. 1.

FIG. 3 is a continuation of the flowchart illustrated in FIG. 2.

FIG. 4A is an example of a password entry screen that is displayed by the display-control unit illustrated in FIG. 1.

FIG. 4B is an example of a password entry screen that is displayed by the display-control unit illustrated in FIG. 1.

DETAILED DESCRIPTION

In the following, embodiments of the present disclosure will be explained in detail with reference to the drawings. In the embodiments below, the same references numbers will be used for components having the same function.

Figure 1:
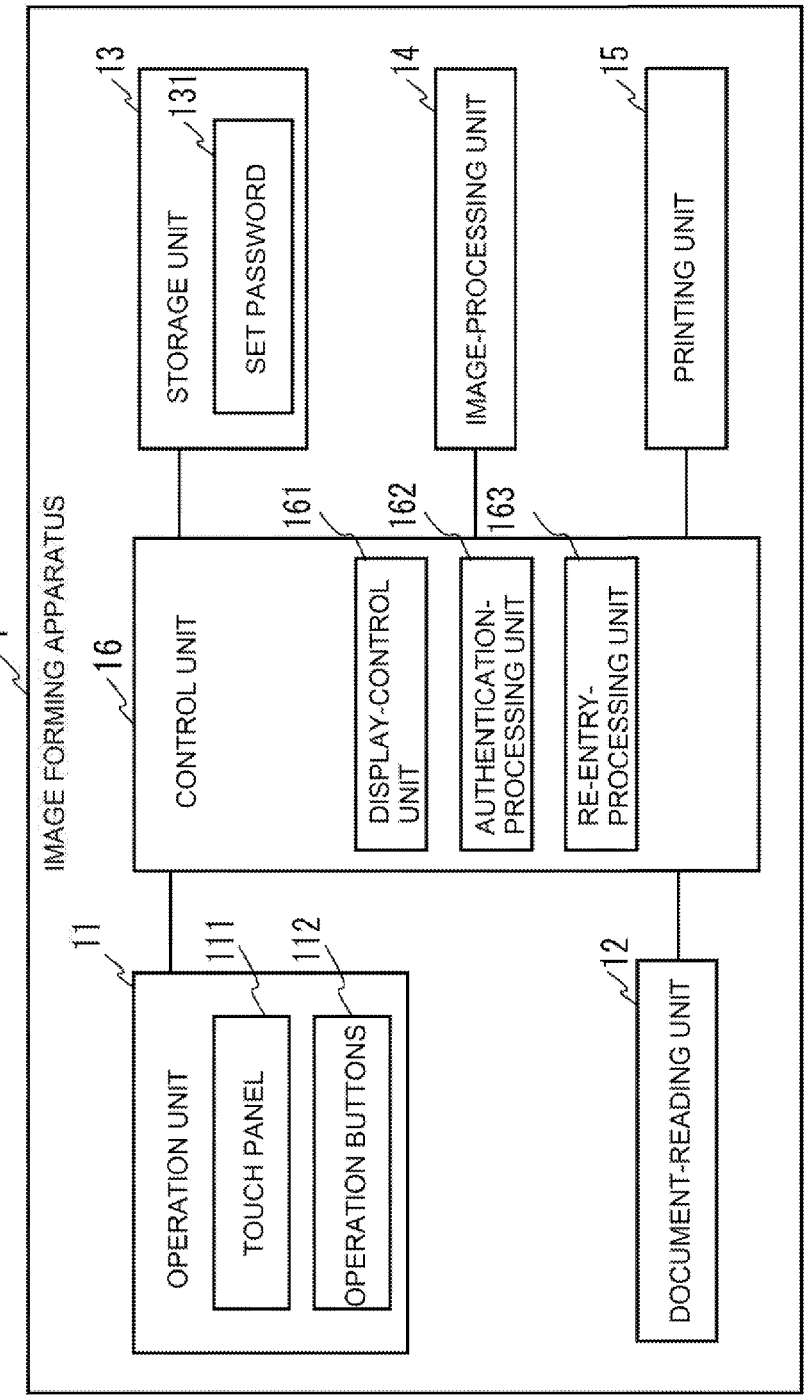
FIG. 1 is a function block diagram illustrating an overview of the configuration of an image forming apparatus of an embodiment according to the present disclosure.

Referring to FIG. 1, an image forming apparatus 1 that is a copier or MFP functions as an authenticating apparatus that executes user authentication by comparing an entered password with a set password. The image forming apparatus 1 includes an operation unit 11, an image-reading unit 12, a storage unit 13, an image-processing unit 14, a printing unit 15 and a control unit 16.

The operation unit 11 includes a touch panel 111 and operation buttons 112. The touch panel 111 is provided with transparent pressure-sensitive sensors on the surface of a display unit that displays various kinds of operation keys and the image-formation status, and functions as a display unit and an input unit. The touch panel 111 detects a touched position on the display surface, and by outputting a signal that corresponds to the touched position, receives a touch operation for an operation key that is displayed on the display unit. The operation buttons 112 include various kinds of operation keys such as a ten-key for inputting numbers such as the number of pages to print and the like, a reset key for inputting an instruction for initializing the setting information, a stop key for stopping the copying operation, a start key for inputting an output instruction that starts the printing operation, and the like.

The document-reading unit 12 is a scanner that reads a document image by irradiating light on a document that is supplied by a document-feeding unit, or a document that is placed on the platen glass by a user, and receiving the reflected light.

The storage unit 13 is a storage unit such as a semiconductor memory, HDD or like, and is a storage unit for storing image data and the like that is read by the document-reading unit 12. Moreover, a set password 131 that is set beforehand is stored in the storage unit 13. The set password 131 is a password that is used for comparison in user authentication in order to determine whether an entered password 81 is entered correctly.

The image-processing unit 14 performs specific image processing on the image data. The image-processing unit 14 performs, for example, enlargement or reduction processing, or image-improvement processing such as density adjustment, tone adjustment, and the like.

The printing unit 15 is a printing unit for printing image data that is stored in the storage unit 13. The printing unit 15, for example, forms a latent image on the surface of a photosensitive drum based on image data that is read from the storage unit 13, performs image formation by using toner to form a toner image from the latent image, then transfers the toner image from the photosensitive drum to printing paper, fixes that toner image to the printing paper, and discharges the paper.

The control unit 16 is connected to the operation unit 11, the document-reading unit 12, the storage unit 13, the image-processing unit 14 and the printing unit 15, respectively. The control unit 16 is an information-processing unit such as a microcomputer or the like that includes a ROM, RAM and the like. The ROM stores a control program for performing operation control of the image forming apparatus 1. The control unit 16 performs overall control of the apparatus by reading the control program that is stored in the ROM, and expanding the control program in the RAM.

Moreover, the control unit 16 functions as a display-control unit 161, an authentication-processing unit 162, and a re-entry-processing unit 163. The display-control unit 161 has a function for generating various display screens and displaying those screens on the touch panel. The authorization-processing unit 162 has a function for executing user authentication by comparing whether an entered password that is entered by the user matches a set password 131. The re-entry-processing unit 163 has a function for receiving the re-entry of an entered password when an incorrect entered password is entered.

Next, the flow of the authentication process by the image forming apparatus will be explained with reference to FIG. 2 and FIG. 3.

First, the display-control unit 161 displays a password-entry screen G80 as illustrated in FIG. 4A on the touch panel (step S11).

A software keyboard 84, an input field 82, and an OK button B80 are arranged on the password-entry screen G80. The software keyboard 84 includes plural input keys 83 that represent characters, numbers, or symbols (characters or the like). Characters and the like are entered into the input field 82 via the software keyboard 84. A confirming instruction for the input in the input field 82 is sent by the OK button B80. The user enters an entered password 82 using the software keyboard 84, and operates the OK button B80. The display-control unit 161, from the aspect of security, displays a turned character such as "*" or the like in the place of the characters or the like that are entered into the input field 82.

As illustrated in FIG. 4B, when the OK button B80 is operated in a state in which characters or the like are entered into the input field 82, the authentication-processing unit 162 receives the characters or the like that are entered in the input field 82 as the entered password 81 (step S12), and compares the entered password 81 with the set password 131 (step S13). More specifically, the authentication-processing unit 162 determines whether or not the entered password 81 matches the set password 131 by comparing the entered password 81 and the set password 131 one character at a time in order from the start of each password.

When the entered password 81 matches the set password 131 (step S14: YES), the authorization-processing unit 162 determines that authorization is successful (step S15), and this process ends. As a result, the login process or the like for the user that corresponds to the entered password 81 is executed.

However, when the entered password 81 includes characters that are different from and do not match those of the set password 131, the entered password 81 and the set password 131 do not match (step S14: NO), and the authorization-processing unit 162 determines that authorization failed (step S16). When it is determined that authorization failed, the display-control unit 161 causes a re-entry screen G90 (refer to FIG. 5A, FIG. 6A) to be displayed on the touch panel (step S17 in FIG. 3).

An error-notification area 91, a display area 92, a software keyboard 84, an input field 82, and an OK button B90 are arranged on the re-entry screen G90. The error-notification area 91 notifies that the entered password 81 is wrong. The display area 92 displays the entire entered password 81. With the OK button B90, an instruction to confirm the input in the input field 82 is sent. The re-entry screen G90 can be called a screen for receiving input for re-entering related to the entered password 81 when the entered password 81 is wrong.

The user views the displayed entered password 81, and enters correction characters 93 for correctly correcting the wrong portion into the input field 82 via the software keyboard 84, and operates the OK button B90. As correction characters 93, there are replacement characters for correcting the entered password 81 by replacement, and there are deletion characters for correcting the entered password by deletion. In the following explanation, a blank character " " (space) is assigned as a deletion character, characters other than a space " " are assigned as replacement characters, however, other characters may also be set as appropriate.

Figure 5A:
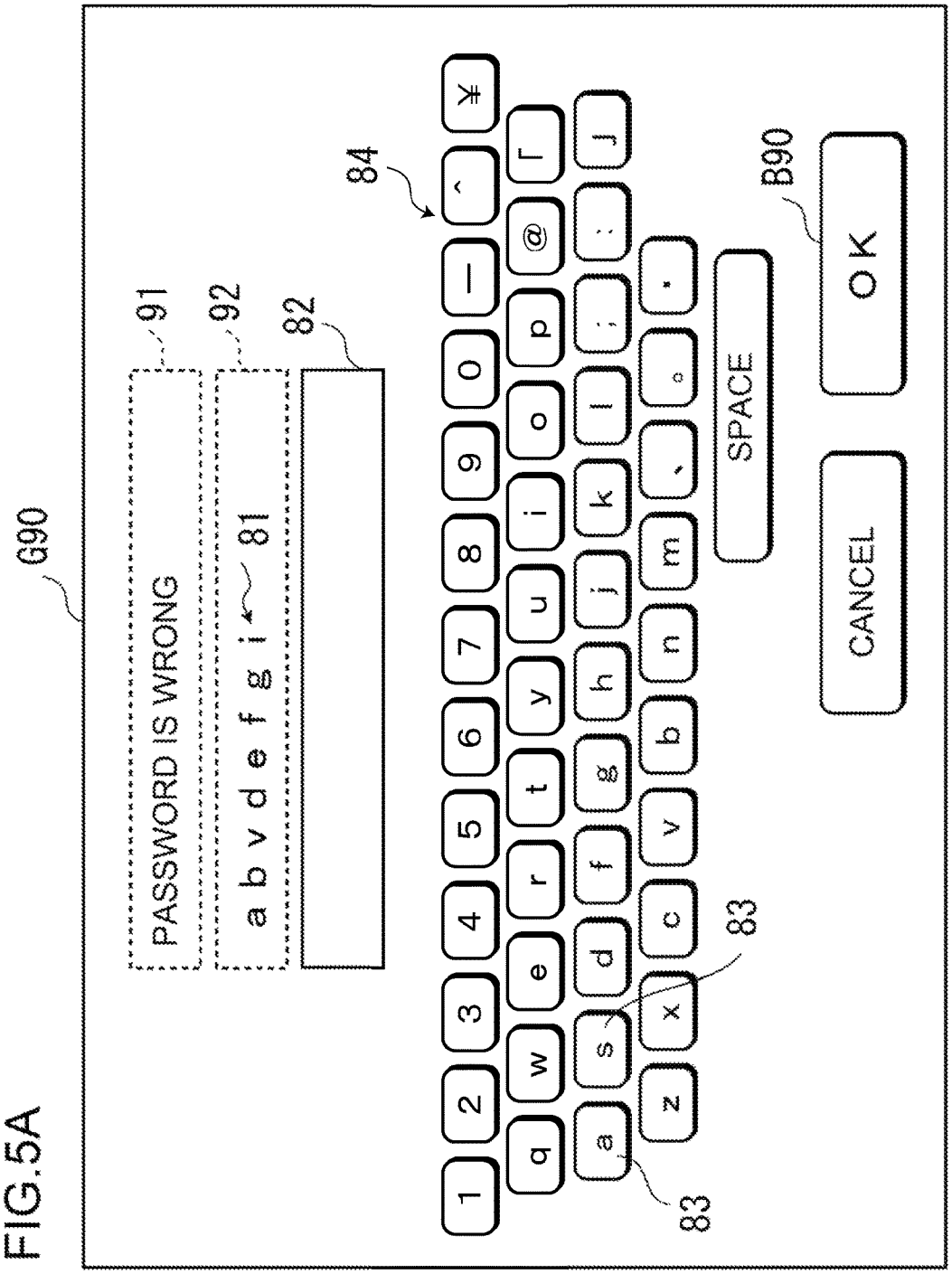
FIG. 5A is an example of a re-entry screen that is displayed by the display-control unit illustrated in FIG. 1.

For example, when the set password 131 is "abcdefgh", and the entered password 81 is "abvdefgi", the re-entry screen G90 illustrated in FIG. 5A is displayed. In this case, the third character "v" and the eighth character "i" of the entered password 81 are characters that do not match. The user can then enter "c" and "h" in the input field 82 via the software keyboard 84, and operate the OK button B90.

Figure 6A:
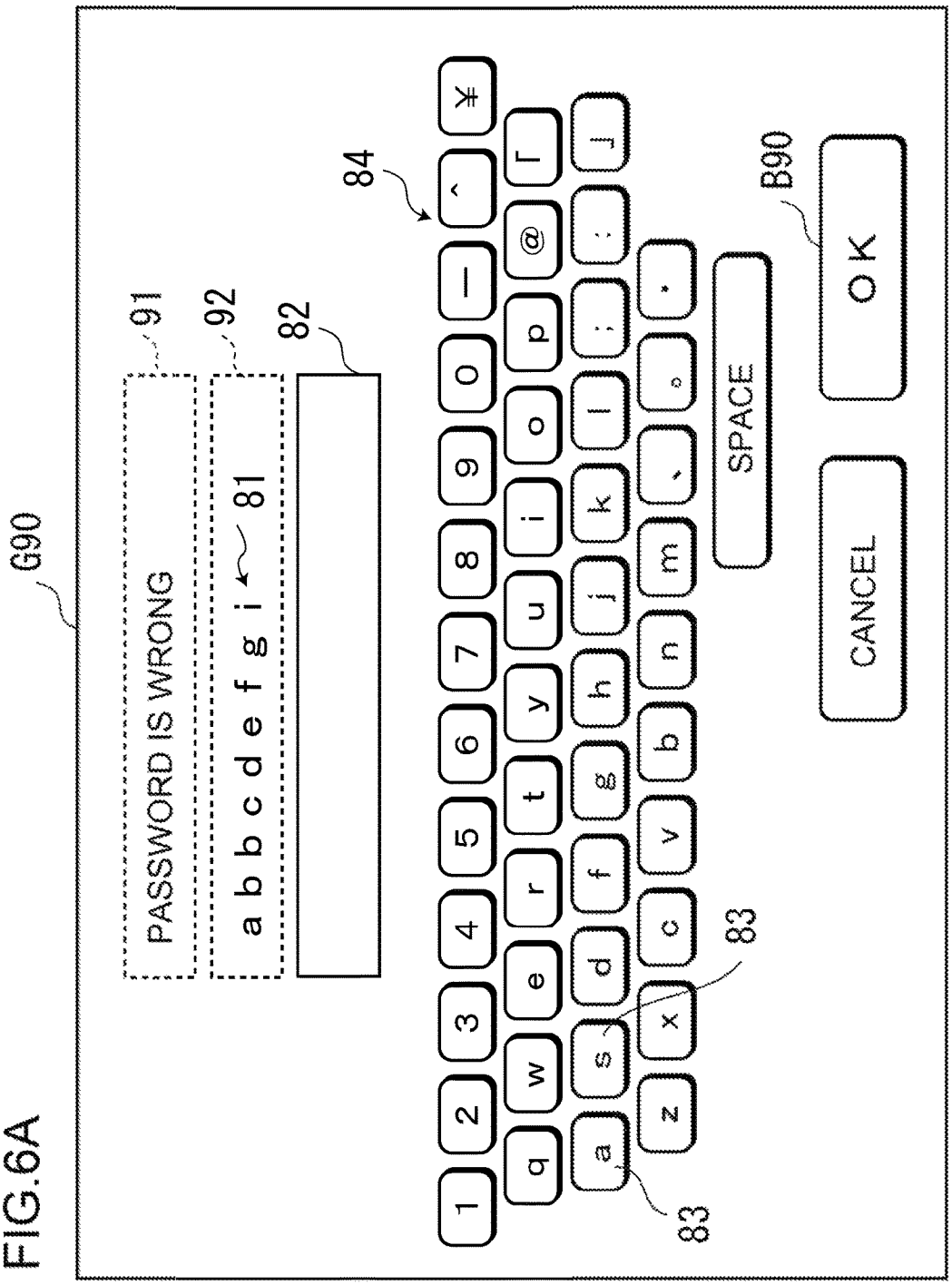
FIG. 6A is an example of a re-entry screen that is displayed by the display-control unit illustrated in FIG. 1.

Moreover, when the set password 131 is "abcdefgh" and the entered password 81 is "abbcdefgi", the re-entry screen G90 illustrated in FIG. 6A is displayed. In this case, the third to ninth characters of the entered password 81 are characters that do not match. The user may enter " " (space) and "h" via the software keyboard 84, and operate the OK button B90.

Figure 5B:
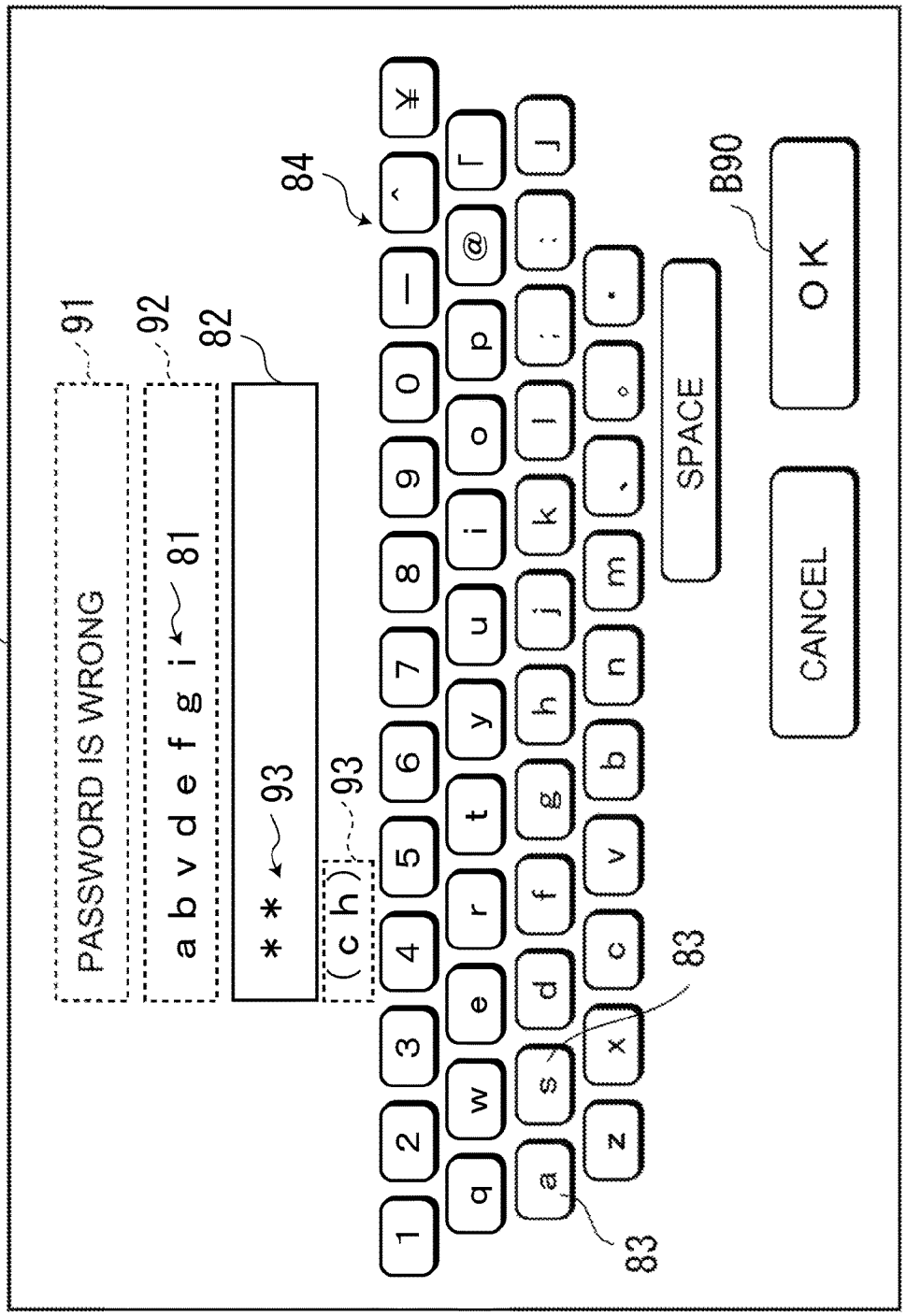
FIG. 5B is an example of a re-entry screen that is displayed by the display-control unit illustrated in FIG. 1.
Figure 6B:
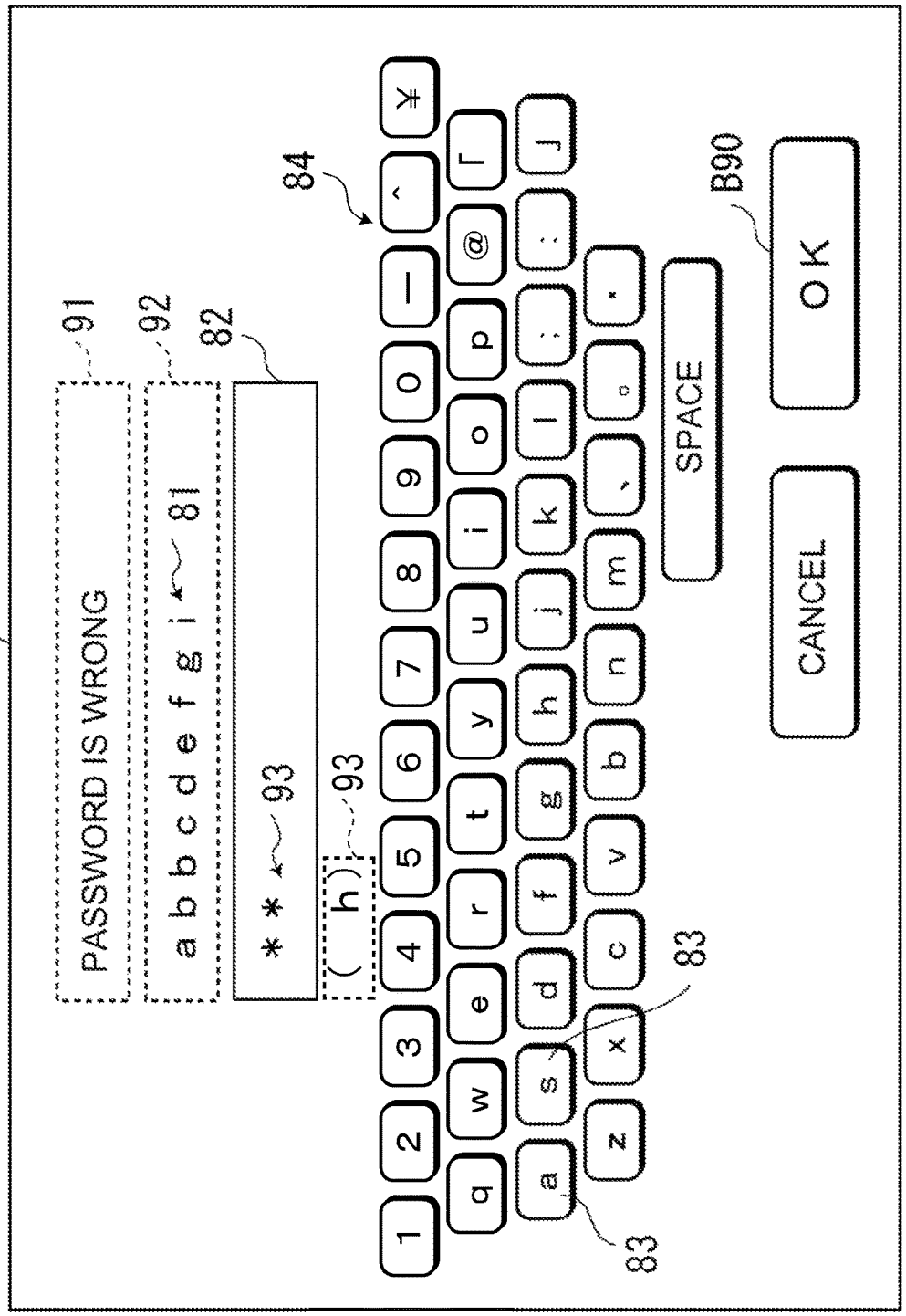
FIG. 6B is an example of a re-entry screen that is displayed by the display-control unit illustrated in FIG. 1.

When the OK button B90 is operated in a state in which characters and the like are entered in the input field 82 as illustrated in FIG. 5B and FIG. 6B, the re-entry-processing unit 163 receives the characters and the like that are entered in the input field 82 as correction characters 93 for the entered password 81 (step S18). In FIG. 5B and FIG. 6B in order to indicate the contents entered as correction characters 93 so as to be able to understand, the correction characters 93 are displayed below the input field 82 in a visible manner instead of turned characters, however, the characters are not actually displayed.

Continuing, the re-entry-processing unit 163 obtains the entered password 81 that is displayed on the re-entry screen G90 as a failed password (step S19), and identifies the first character of the failed password that does not match (step S20). For example, when the failed password is "abvdefgi", the third character "v" is identified as the first character that does not match.

For the non-matching characters of the failed password, the re-entry-processing unit 163 may identify non-matching characters inside the failed password by comparing the obtained failed password with the set password 131, or may identify non-matching characters inside the failed password by obtaining the comparison results from the authentication-processing unit 162.

Next, the re-entry-processing unit 163 determines whether or not the received correction characters 93 are deletion characters (step S21). When there are plural received correction characters 93, the re-entry-processing unit 163 processes the characters one character at a time starting from the first.

When a correction character 93 is not a deletion character (step S21: NO), or in other words, when the correction character is a replacement character, the re-entry-processing unit 163 replaces the identified non-matching character with the replacement character (step S22). Next, the re-entry-processing unit 163 determines whether or not there is a next correction character 93 (step S23), and when there is a next correction character 93 (step S23: YES), the re-entry-processing unit 163 determines whether or not there is a next non-matching character in the failed password (step S24). When there is a next non-matching character (step S24: YES), the re-entry-processing unit 163 identifies the next non-matching character (step S30), and processing returns to step S21 for determining whether or not the correction character 93 is a deletion character.

On the other hand, when there is no next correction character 93 (step S23: NO), the authentication-processing unit 162 receives the failed password that is corrected by the re-entry-processing unit 163 as re-entry of the entered password 81 (step S32), and processing returns to the processing of step S13 in FIG. 2 for comparison with the set password 131. As a result, by entering replacement characters as correction characters 93, the failed password for which the non-matching characters have been replaced with correction characters 93 is received as re-entry of the entered password 81, so it is not necessary to re-enter the entire entered password 81, and thus it is possible to save time and effort for re-entering the password.

When there is a remaining correction character 93 even though there is no remaining non-matching character in the failed password (step S24: NO), the re-entry-processing unit 163 adds the remaining correction character(s) 93 to the end of the failed password (step S31), then processing advances to step S32. This is because there are cases when the number of characters in the failed password is not enough for the number of characters of the set password 131.

However, when the correction character 93 is a deletion character (step S21: YES), the re-entry-processing unit 163 deletes the identified non-matching character (step S25), then determines whether or not there is a next correction character 93 (step S26). When there is no next correction character 93 (step S26: NO), processing advances to step S32.

However, when there is a next correction character 93 (step S26: YES), the re-entry-processing unit 163 obtains a character string from within the set password 131 that corresponds to the portion of the failed password after the deletion position (step S27). For example, as illustrated in FIG. 6B, the case is presumed in which when the failed password is "abbcdefgi" and "h" is entered as the correction character 93, the identified non-matching character is the third character "b", and the correction character 93 to be processed by the re-entry-processing unit 163 is a deletion character " " (space). In this case, the re-entry-processing unit 163 deletes the non-matching third character "b", and obtains the character string "cdefgh" after the third character of the set password 131 that corresponds to the portion after the third character that is the deletion position.

Continuing, the re-entry-processing unit 163 compares the character string of the failed password starting from the deletion position with the obtained character string of the set password 131 (step S28), and determines whether or not there is a non-matching character (step S29). As a result, "cdefgi" of the failed password is compared with "cdefgh" of the set password 131, for example, and it is determined that "i" in the failed password is a non-matching character.

In other words, when there are plural entered correction characters 93 and there is a correction character 93 next after a deletion character, the re-entry-processing unit 163 deletes the non-matching character of the failed password based on the deletion character. After that, the re-entry-processing unit 163 compares the character string after the deletion position of the non-matching character of the failed password with the character string of the set password 131 that corresponds to the portion starting from the deletion portion of the failed password, and identifies a non-matching character in the failed password that is to be corrected based on the next correction character after the deletion character. As a result, it is possible to correct a non-matching character according to the intention of the user with the correction character 93 that is entered next after the deletion character.

Moreover, by deleting an extra non-matching character within the failed password with a deletion character, there may be cases in which a non-matching character that exists in the portion after the deletion position matches the set password 131. Therefore, by deleting a non-matching character with a deletion character, it is possible to reduce the number of correction characters 93 entered more than when replacing a non-matching character with a replacement character. Therefore, by using deletion characters, it is possible to save time for re-entry.

When as a result of comparison there is a non-matching character (step S29: YES), the re-entry-processing unit 163 identifies the next non-matching character (step S30), and processing returns to step S21 for determining whether or not the correction character 93 is a deletion character.

As a result of comparison, when correction characters 93 remain even though there are no non-matching characters (step S29: NO), the re-entry-processing unit 163 adds the remaining correction characters 93 to the end of the failed password (step S31). Next, the authorization-processing unit 162 receives the failed password that is corrected by the re-entry-processing unit 163 as a re-entry of the entered password 81 (step S32), and processing returns to step S13 in FIG. 2 for comparison with the set password 131.

When the entered password 81 that is corrected by the re-entry-processing unit 163 does not match the set password 131, the entire entered password 81 that is entered the first time via the password-entry screen G80 may be displayed in the display area 92 of the re-entry screen G90 so as to be visible. In other words, the display-control unit 161 may also cause the entered password that was received by the authorization-processing unit 162 not by way of the re-entry-processing unit 163 to be displayed instead of the entered password 81 that is corrected by the re-entry-processing unit 163. This is because each time the entered password 81 is displayed on the re-entry screen G90 and non-matching characters in the entered password 81 are corrected and displayed, there is a possibility that a third party could distinguish the correct portions and the wrong portions in the entered password 81.

Moreover, the re-entry-processing unit 163 corrects the failed password by receiving correction characters 93 that are entered in the input field 82 when the OK button B90 is operated, however, the re-entry-processing unit 163 may also correct the failed password each time that a correction character 93 is entered in the input field 82. In that case, the re-entry-processing unit 163 can determine whether or not there is a next correction character 93 (step S23 and step S26 illustrated in FIG. 3) by determining whether or not a correction character 93 is entered in the input field 82 within a specified amount of time. Moreover, input is not limited to a software keyboard 84, and characters and the like may be entered in the input field 82 via another input unit such as operation buttons 112.

In this way, the image forming apparatus 1 of this embodiment includes an authentication-processing unit 162, a display area 92, a display-control unit 161 and a re-entry-processing unit 163. The authentication-processing unit 162 executes user authentication by comparing an entered password 81 with a set password 131. The display area 92 displays the entire entered password 81 so as to be visible when the entered password 81 includes non-matching characters that are different from the set password 131. The display-control unit 161 causes a re-entry screen G90 on which an input field 82 is arranged in which correction characters 93 that correct non-matching characters of an entered password 81 are entered to be displayed. The re-entry-processing unit 163 corrects the non-matching characters of the entered password 81 based on correction characters 93 that are entered in the input field 82. The authentication-processing unit 162 compares the entered password 81 that is corrected by the re-entry-processing unit 163 with the set password 131.

As a result, when the entered password 81 and the set password 131 do not match, and re-entry of the entered password 81 is requested, it is possible to reduce the number of characters that the user re-enters. Moreover, the entire wrong entered password 81 is displayed so as to be visible, so a third party is not able to distinguish what characters of the entered password 81 are wrong, and thus there is no decrease in safety performance.

In the typical technology, only the characters that are correctly entered are displayed so as to be unrecognizable, so it is known which number position of the characters entered in the password that failed authentication are correct. Therefore, there is a problem in that as a third party that does not know the password re-enters the password over and over again, eventually the correct password is reached.

With this disclosure it is possible to save time and effort for re-entering a password without a decrease in security performance.

The present disclosure is not limited to the embodiment described above, and needless to say it is possible to make various modifications within a range that does not depart from the scope of the present disclosure.

What is claimed is:

1. An authenticating apparatus comprising:
   an authentication-processing unit that executes user authentication by comparing an entered password with a set password;
   a display area that displays the entire entered password so as to be visible when the entered password includes non-matching characters that are different from the set password;
   a display-control unit that causes a re-entry screen on which an input field is arranged in which correction characters for correcting the non-matching characters of the entered password are entered to be displayed; and
   a re-entry-processing unit that corrects the non-matching characters of the entered password based on the correction characters that are entered in the input field;
   wherein
   the authentication-processing unit compares the entered password that is corrected by the re-entry-processing unit with the set password; and
   after login has failed due to the entered password including non-matching characters and the re-entry screen was displayed for receiving the correction characters, the authentication-processing unit authenticates the user when only the correction characters corresponding to the non-matching characters were entered in the input field of the re-entry screen.

2. The authenticating apparatus according to claim 1, wherein
   the re-entry-processing unit
   replaces the non-matching characters of the entered password with replacement characters when the entered correction characters are replacement characters for replacing the non-matching characters.

3. The authenticating apparatus according to claim 1, wherein
   the re-entry-processing unit
   deletes the non-matching characters of the entered password when the deletion characters for deleting the non-matching characters are entered as the correction characters.

4. The authenticating apparatus according to claim 3, wherein
   when there are plural entered correction characters and there is a correction character next after the deletion character,
   the re-entry-processing unit
   deletes the non-matching character of the entered password based on the deletion character, and then compares a character string starting from the deletion position of the non-matching character of the entered password with a character string of the set password that corresponds to the character string starting from deletion position of the entered password, and identifies the non-matching character of the entered password to be corrected based on the next correction character.

5. The authenticating apparatus according to claim 1, wherein
   when there are remaining correction characters even though there are no remaining non-matching characters in the entered password,
   the re-entry-processing unit
   adds the remaining correction characters to the end of the entered password and performs correction.

6. The authenticating apparatus according to claim 1, wherein
   when the entered password that is corrected by the re-entry-processing unit does not match the set password,
   the display-control unit
   causes the entered password that was entered the first time to be displayed in the display area.

* * * * *